(12) United States Patent
Hu et al.

(10) Patent No.: US 11,320,564 B1
(45) Date of Patent: May 3, 2022

(54) METHOD AND SYSTEM FOR DETERMINING SINGLE-WELL DYNAMIC RESERVE AND RECOVERABLE RESERVE OF GAS-DRIVE RESERVOIR

(71) Applicant: Southwest Petroleum University, Sichuan (CN)

(72) Inventors: Shuyong Hu, Sichuan (CN); Bingyang Zheng, Sichuan (CN); Nana Song, Sichuan (CN); Xueqiang Guo, Sichuan (CN)

(73) Assignee: SOUTHWEST PETROLEUM UNIVERSITY, Sichuan (CN)

( * ) Notice: Subject to any disclaimer, the term of this patent is extended or adjusted under 35 U.S.C. 154(b) by 0 days.

(21) Appl. No.: 17/314,133

(22) Filed: May 7, 2021

(51) Int. Cl.
*G01V 99/00* (2009.01)
*E21B 49/08* (2006.01)

(52) U.S. Cl.
CPC .......... *G01V 99/00* (2013.01); *E21B 49/0875* (2020.05)

(58) Field of Classification Search
None
See application file for complete search history.

(56) References Cited

FOREIGN PATENT DOCUMENTS

| CN | 107169684 | A | * | 9/2017 | |
|---|---|---|---|---|---|
| CN | 108520143 | A | * | 9/2018 | |
| CN | 108756868 | A | * | 11/2018 | ............. E21B 49/00 |
| CN | 110543619 | A | * | 12/2019 | |
| CN | 111709847 | A | * | 9/2020 | |

\* cited by examiner

*Primary Examiner* — Lina M Cordero
(74) *Attorney, Agent, or Firm* — Onello & Mello, LLP

(57) ABSTRACT

A method and system determines a single-well dynamic reserve and recoverable reserve of a gas-drive reservoir. An example method includes: calculating a gas saturation of a gas-drive reservoir based on a principle of material balance; establishing a relationship between an oil-gas relative permeability ratio and oil-gas flow rates based on Darcy's law; fitting a binomial relationship between the oil-gas relative permeability ratio and the gas saturation based on an oil-gas seepage law; and establishing a gas-drive characteristic curve relationship between a produced gas-oil ratio and a cumulative oil production under a steady seepage flow of the gas-drive reservoir based on the above relationships and the gas saturation, and calculating a single-well dynamic reserve and recoverable reserve of the gas-drive reservoir based on binomial regression coefficients of the binomial relationship and the gas-drive characteristic curve relationship.

9 Claims, 5 Drawing Sheets

METHOD AND SYSTEM FOR DETERMINING SINGLE-WELL DYNAMIC RESERVE AND RECOVERABLE RESERVE OF GAS-DRIVE RESERVOIR

TECHNICAL FIELD

The present disclosure relates to the field of reservoir engineering, in particular to a method and system for determining a single-well dynamic reserve and recoverable reserve of a gas-drive reservoir.

BACKGROUND

A conventional gas-drive characteristic curve is derived and established on the basis of a linear relationship between the oil-gas relative permeability ratio and the gas saturation in a semi-log plot. However, in fact, it is only when the gas saturation is in an intermediate stage, that the oil-gas relative permeability ratio and the gas saturation are in a linear relationship. In example embodiments a system and method in accordance with principles of inventive concepts improves the calculation efficiency and accuracy in the determination of a single-well dynamic reserve and recoverable reserve of a gas-drive reservoir.

SUMMARY

In view of this, the present disclosure provides a method and system for determining a single-well dynamic reserve and recoverable reserve of a gas-drive reservoir. A system and method in accordance with principles of inventive concepts may improve the calculation efficiency and accuracy in the determination of a single-well dynamic reserve and recoverable reserve of a gas-drive reservoir.

To achieve the above purpose, the present disclosure provides the following technical solutions. A method for determining a single-well dynamic reserve and recoverable reserve of a gas-drive reservoir includes:

calculating a gas saturation of a gas-drive reservoir based on a principle of material balance;

establishing a relationship between an oil-gas relative permeability ratio and oil-gas flow rates based on Darcy's law;

fitting a binomial relationship between the oil-gas relative permeability ratio and the gas saturation based on an oil-gas seepage law;

establishing a gas-drive characteristic curve relationship between a produced gas-oil ratio and a cumulative oil production under a steady seepage flow of the gas-drive reservoir based on relationships between oil-gas formation flow rates and surface flow rates, the relationship between the oil-gas relative permeability ratio and the oil-gas flow rates, the binomial relationship between the oil-gas relative permeability ratio and the gas saturation, as well as the gas saturation, and determining binomial regression coefficients of the gas-drive characteristic curve relationship; and determining a single-well dynamic reserve and recoverable reserve of the gas-drive reservoir based on the binomial regression coefficients of the gas-drive characteristic curve relationship and binomial regression coefficients of the binomial relationship between the oil-gas relative permeability ratio and the gas saturation.

In example embodiments, the calculation of a gas saturation of a gas-drive reservoir based on a principle of material balance may include:

calculating an oil saturation of the gas-drive reservoir based on a principle of material balance:

$$S_o = \frac{(N-N_p)B_o}{NB_{oi}/(1-S_{wi})} = \frac{(N-N_p)B_o}{NB_{oi}}(1-S_{wi});$$

where, $S_o$ represents the oil saturation; N represents a geologic reserve of oil; $N_p$ represents a cumulative oil production; $B_o$ represents an oil formation volume factor; $B_{oi}$ represents an initial oil formation volume factor; $S_{wi}$ represents an irreducible water saturation;

calculating the gas saturation based on the oil saturation:

$$S_g = 1 - S_{wi} - S_o.$$

In example embodiments, the relationship between the oil-gas relative permeability ratio and the oil-gas flow rates may be given as:

$$\frac{q_g}{q_o} = \frac{\mu_o}{\mu_g} \cdot \frac{k_{rg}}{k_{ro}};$$

where, $q_g$ represents a gas flow rate under a formation condition; $q_o$ represents an oil flow rate under the formation condition; $\mu_o$ represents an oil viscosity under the formation condition; $\mu_g$ represents a gas viscosity under the formation condition; $k_{ro}$ represents a relative permeability of oil; $k_{rg}$ represents a relative permeability of gas.

In example embodiments, the binomial relationship between the oil-gas relative permeability ratio and the gas saturation may be given as:

$$\ln\frac{k_{ro}}{k_{rg}} = aS_g^2 + bS_g + \ln c;$$

where, $k_{ro}$ represents a relative permeability of oil; $k_{rg}$ represents a relative permeability of gas; $S_g$ represents a gas saturation; a represents a quadratic coefficient among the binomial regression coefficients of the binomial relationship between the oil-gas relative permeability ratio and the gas saturation; b represents a linear coefficient among the binomial regression coefficients of the binomial relationship between the oil-gas relative permeability ratio and the gas saturation; lnc represents a constant among the binomial regression coefficients of the binomial relationship between the oil-gas relative permeability ratio and the gas saturation.

In example embodiments, the establishing a gas-drive characteristic curve relationship between a produced gas-oil ratio and a cumulative oil production under a steady seepage flow of the gas-drive reservoir based on relationships between oil-gas formation flow rates and surface flow rates, the relationship between the oil-gas relative permeability ratio and the oil-gas flow rates, the binomial relationship between the oil-gas relative permeability ratio and the gas saturation, as well as the gas saturation, and determining binomial regression coefficients of the gas-drive characteristic curve relationship may include:

establishing relationships between oil-gas formation flow rates and surface flow rates:

$$\begin{cases} q_g = (q_{gsc} - q_{osc}R_{si})B_g \\ q_o = q_{osc}B_o \end{cases};$$

where, $q_g$ represents a gas flow rate under a formation condition; $q_o$ represents an oil flow rate under the formation condition; $q_{gs}$ represents a gas flow rate under a surface condition; $q_{osc}$ represents an oil flow rate under the surface condition; $B_g$ represents a gas formation volume factor; $R_{si}$ represents an initial solution gas-oil ratio; $B_o$ represents an oil formation volume factor;

establishing a gas-drive characteristic curve relationship between a produced gas-oil ratio and a cumulative oil production under a steady seepage flow of the gas-drive reservoir based on the relationships between the oil-gas formation flow rates and surface flow rates, the relationship between the oil-gas relative permeability ratio and the oil-gas flow rates, the binomial relationship between the oil-gas relative permeability ratio and the gas saturation, as well as the gas saturation:

$$\ln(GOR - R_{si}) =$$

$$\frac{aB_o^2(1-S_{wi})^2}{N^2 B_{oi}^2} N_p^2 + \frac{2aNB_o(B_{oi}-B_o)(1-S_{wi})^2 + bNB_{oi}B_o(1-S_{wi})}{N^2 B_{oi}^2} N_p +$$

$$\frac{aNB_o(B_{oi}-B_o)(1-S_{wi})^2 + bNB_{oi}B_o(1-S_{wi})}{N^2 B_{oi}^2} + \ln\frac{\mu_o B_o c}{\mu_g B_g};$$

where, GOR represents a produced gas-oil ratio, GOR=$q_{gsc}$/$q_{osc}$; $q_{gsc}$ represents a gas flow rate under the surface condition; $q_{osc}$ represents an oil flow rate under the surface condition; $R_{si}$ represents an initial solution gas-oil ratio; a represents a quadratic coefficient among the binomial regression coefficients of the binomial relationship between the oil-gas relative permeability ratio and the gas saturation; b represents a linear coefficient among the binomial regression coefficients of the binomial relationship between the oil-gas relative permeability ratio and the gas saturation; lnc represents a constant among the binomial regression coefficients of the binomial relationship between the oil-gas relative permeability ratio and the gas saturation; $B_o$ represents an oil formation volume factor, $B_{oi}$ represents an initial oil formation volume factor; $S_{wi}$ represents an irreducible water saturation; N represents a geologic reserve of oil; $N_p$ represents a cumulative oil production; $\mu_o$ represents an oil viscosity under the formation condition; $\mu_g$ represents a gas viscosity under the formation condition; $B_g$ represents a gas formation volume factor;

determining binomial regression coefficients of the gas-drive characteristic curve relationship:

$$\begin{cases} A = \dfrac{aB_o^2(1-S_{wi})^2}{N^2 B_{oi}^2} \\ B = \dfrac{2aNB_o(B_{oi}-B_o)(1-S_{wi})^2 + bNB_{oi}B_o(1-S_{wi})}{N^2 B_{oi}^2} \\ C = \dfrac{aNB_o(B_{oi}-B_o)(1-S_{wi})^2 + bNB_{oi}B_o(1-S_{wi})}{N^2 B_{oi}^2} + \ln\dfrac{\mu_o B_o c}{\mu_g B_g} \end{cases};$$

where, A represents a quadratic coefficient among the binomial regression coefficients of the gas-drive characteristic curve relationship; B represents a linear coefficient among the binomial regression coefficients of the gas-drive characteristic curve relationship; C represents a constant among the binomial regression coefficients of the gas-drive characteristic curve relationship.

In example embodiments, the determining a single-well dynamic reserve and recoverable reserve of the gas-drive reservoir based on the binomial regression coefficients of the gas-drive characteristic curve relationship and binomial regression coefficients of the binomial relationship between the oil-gas relative permeability ratio and the gas saturation may include:

determining a single-well dynamic reserve of the gas-drive reservoir based on the quadratic coefficient among the binomial regression coefficients of the gas-drive characteristic curve relationship and the quadratic coefficient among the binomial regression coefficients of the binomial relationship between the oil-gas relative permeability ratio and the gas saturation; and determining a recoverable reserve of the gas-drive reservoir based on the binomial regression coefficients of the gas-drive characteristic curve relationship.

In example embodiments, the single-well dynamic reserve may be given as:

$$N_s = \sqrt{\frac{aB_o^2(1-S_{wi})^2}{AB_{oi}^2}} = \sqrt{\frac{a}{A}} \frac{B_o}{B_{oi}}(1-S_{wi});$$

where, $N_s$ represents the single-well dynamic reserve; a represents a quadratic coefficient among the binomial regression coefficients of the binomial relationship between the oil-gas relative permeability ratio and the gas saturation; $B_o$ represents an oil formation volume factor; $B_{oi}$ represents an initial oil formation volume factor; $S_{wi}$ represents an irreducible water saturation; A represents a quadratic coefficient among the binomial regression coefficients of the gas-drive characteristic curve relationship.

In example embodiments, the recoverable reserve may be given as:

$$N_{pmax} = \frac{-B + \sqrt{B^2 - 4A(C - \ln(GOR_{max} - R_{si}))}}{2A};$$

where, $N_{pmax}$ represents the recoverable reserve; A represents a quadratic coefficient among the binomial regression coefficients of the gas-drive characteristic curve relationship; B represents a linear coefficient among the binomial regression coefficients of the gas-drive characteristic curve relationship; C represents a constant among the binomial regression coefficients of the gas-drive characteristic curve relationship; $GOR_{max}$ represents an economic-limit produced gas-oil ratio; $R_{si}$ represents an initial solution gas-oil ratio.

In example embodiments a system for determining a single-well dynamic reserve and recoverable reserve of a gas-drive reservoir includes:

a gas saturation calculation module, for calculating a gas saturation of a gas-drive reservoir based on a principle of material balance;

a first relationship calculation module, for establishing a relationship between an oil-gas relative permeability ratio and oil-gas flow rates based on Darcy's law;

a second relationship calculation module, for fitting a binomial relationship between the oil-gas relative permeability ratio and the gas saturation based on an oil-gas seepage law;

a third relationship calculation module, for establishing a gas-drive characteristic curve relationship between a produced gas-oil ratio and a cumulative oil production under a steady seepage flow of the gas-drive reservoir based on relationships between oil-gas formation flow rates and surface flow rates, the relationship between the oil-gas relative permeability ratio and the oil-gas flow rates, the binomial relationship between the oil-gas relative permeability ratio and the gas saturation, as well as the gas saturation, and determining binomial regression coefficients of the gas-drive characteristic curve relationship; and a reserve calculation module, for determining a single-well dynamic reserve and recoverable reserve of the gas-drive reservoir based on the binomial regression coefficients of the gas-drive characteristic curve relationship and binomial regression coefficients of the binomial relationship between the oil-gas relative permeability ratio and the gas saturation.

In example embodiments, a gas saturation calculation module may include:

an oil saturation calculation unit, for calculating an oil saturation of the gas-drive reservoir based on a principle of material balance:

$$S_o = \frac{(N - N_p)B_o}{NB_{oi}/(1 - S_{wi})} = \frac{(N - N_p)B_o}{NB_{oi}}(1 - S_{wi});$$

where, $S_o$ represents the oil saturation; N represents a geologic reserve of oil; $N_p$ represents a cumulative oil production; $B_o$ represents an oil formation volume factor; $B_{oi}$ represents an initial oil formation volume factor; $S_{wi}$ represents an irreducible water saturation;

a gas saturation calculation unit, for calculating the gas saturation based on the oil saturation:

$$S_g = 1 - S_{wi} - S_o.$$

In example embodiments a method and system in accordance with principles of inventive concepts may be employed for determining a single-well dynamic reserve and recoverable reserve of a gas-drive reservoir. In example embodiments the system and method characterizes an oil-gas relative permeability ratio and a gas saturation by a semi-log binomial fitted relationship, and then derives and establishes a gas-drive characteristic curve relationship between a produced gas-oil ratio and a cumulative oil production of a gas-drive reservoir based on a principle of material balance and Darcy's law. In example embodiments the system and method quickly calculates a single-well dynamic reserve and a single-well recoverable reserve under an economic-limit gas-oil ratio according to a binomial equation of the oil-gas relative permeability ratio and the gas saturation and a fitted parameter of the gas-drive characteristic curve relationship. A system and method in accordance with principles of inventive concepts can improve the calculation efficiency and accuracy of the determination of single-well dynamic reserve and recoverable reserve of the gas-drive reservoir, and is of great significance for the development of the gas-drive reservoir.

BRIEF DESCRIPTION OF THE DRAWINGS

The drawings are for the purpose of illustrating example embodiments only, and are not to be considered as limiting inventive concepts. Like reference numerals refer to like parts throughout the drawings.

DETAILED DESCRIPTION

Figure 1:
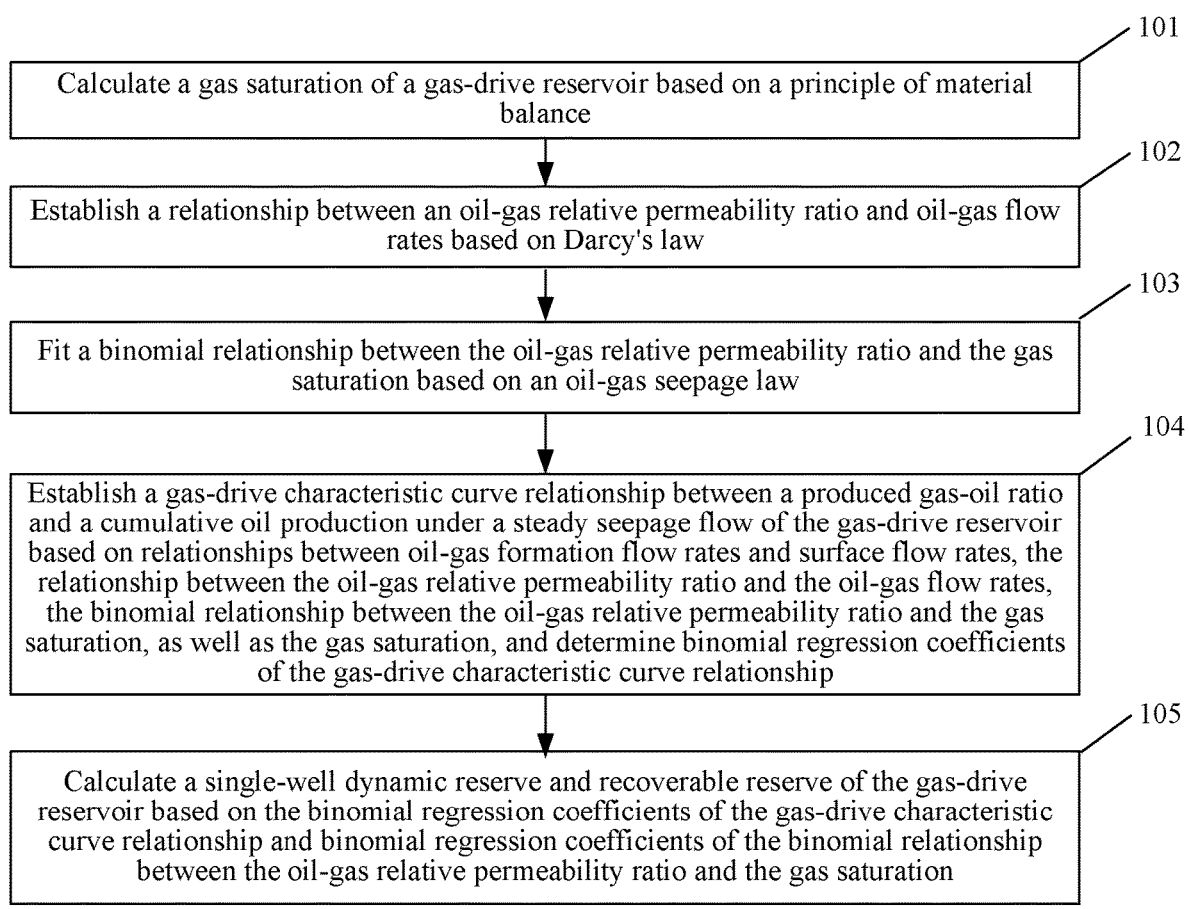
FIG. 1 is a flowchart of a method for determining a single-well dynamic reserve and recoverable reserve of a gas-drive reservoir according to an example embodiment.

Certain embodiments in accordance with the inventive concepts are described below with reference to the accompanying drawings.

It will be understood that, although the terms first, second, etc. may be used herein to describe various elements, these elements should not be limited by these terms. These terms are used to distinguish one element from another, but not to imply a required sequence of elements. For example, a first element can be termed a second element, and, similarly, a second element can be termed a first element, without departing from the scope of the present invention. As used herein, the term "and/or" includes any and all combinations of one or more of the associated listed items.

It will be understood that when an element is referred to as being "on" or "connected" or "coupled" to another element, it can be directly on or connected or coupled to the other element or intervening elements may be present. In contrast, when an element is referred to as being "directly on" or "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more other features, steps, operations, elements, components, and/or groups thereof.

To the extent that functional features, operations, and/or steps are described herein, or otherwise understood to be included within various embodiments of the inventive concept, such functional features, operations, and/or steps can be embodied in functional blocks, units, modules, operations and/or methods. And to the extent that such functional blocks, units, modules, operations and/or methods include computer program code, such computer program code can be stored in a computer readable medium, e.g., such as non-transitory memory and media, that is executable by at least one computer processor.

Correlation coefficients on a binomial fitted curve of an oil-gas relative permeability ratio and a gas saturation in a semi-log plot are larger than those on a linear fitted curve. An example embodiment characterizes an oil-gas relative permeability ratio and a gas saturation by a semi-log binomial fitted relationship, and then derives and establishes a gas-drive characteristic curve relationship between a produced gas-oil ratio and a cumulative oil production of a gas-drive reservoir based on a principle of material balance and Darcy's law. Example embodiments quickly calculate a single-well dynamic reserve and a single-well recoverable reserve under an economic-limit gas-oil ratio according to a binomial equation of the oil-gas relative permeability ratio and the gas saturation and a fitted parameter of a new gas-drive characteristic curve equation.

FIG. 1 is a flowchart of a method for determining a single-well dynamic reserve and recoverable reserve of a gas-drive reservoir according to an example embodiment in accordance with principles of inventive concepts. As shown in FIG. 1, the method for determining a single-well dynamic reserve and recoverable reserve of a gas-drive reservoir in this example embodiment includes:

Step 101: A processor calculating a gas saturation of a gas-drive reservoir based on a principle of material balance.

Step 101 may include:

Calculating an oil saturation of the gas-drive reservoir. For a gas-drive reservoir with no or little water production, the reservoir seepage is equivalent to the oil and gas seepage under an irreducible water saturation. Based on the principle of material balance, the oil saturation of the gas-drive reservoir at any time is a ratio of a remaining oil volume in the reservoir to a pore volume of the reservoir.

$$S_o = \frac{(N-N_p)B_o}{NB_{oi}/(1-S_{wi})} = \frac{(N-N_p)B_o}{NB_{oi}}(1-S_{wi});$$

where, $S_o$ represents the oil saturation; N represents a geologic reserve of oil; $N_p$ represents a cumulative oil production; $B_o$ represents an oil formation volume factor; $B_{oi}$ represents an initial oil formation volume factor; $S_{wi}$ represents an irreducible water saturation.

Step 101 may also include calculating the gas saturation based on the oil saturation in a process of gas injection to displace oil:

$$S_g = 1 - S_{wi} - S_o.$$

In step 102, an example method, employing a processor, establishes a relationship between an oil-gas relative permeability ratio and oil-gas flow rates based on Darcy's law. Under a steady seepage flow of the gas-drive reservoir, the relationship between an oil-gas relative permeability ratio and oil-gas flow rates established based on Darcy's law may be given as:

$$\frac{q_g}{q_o} = \frac{\mu_o}{\mu_g} \cdot \frac{k_{rg}}{k_{ro}};$$

where, $q_g$ represents a gas flow rate under a formation condition; $q_o$ represents an oil flow rate under the formation condition; $\mu_o$ represents an oil viscosity under the formation condition; $\mu_g$ represents a gas viscosity under the formation condition; $k_{ro}$ represents a relative permeability of oil; $k_{rg}$ represents a relative permeability of gas.

In step 103 an example method, employing a processor, fits a binomial relationship between the oil-gas relative permeability ratio and the gas saturation based on an oil-gas seepage law. The binomial relationship between the oil-gas relative permeability ratio and the gas saturation may be given:

$$\ln\frac{k_{ro}}{k_{rg}} = aS_g^2 + bS_g + lnc;$$

where, $k_{ro}$ represents a relative permeability of oil; $k_g$ represents a relative permeability of gas; $S_g$ represents a gas saturation; a, b and lnc are binomial regression coefficients of the binomial relationship between the oil-gas relative permeability ratio and the gas saturation; a represents a quadratic coefficient among the binomial regression coefficients of the binomial relationship between the oil-gas relative permeability ratio and the gas saturation; b represents a linear coefficient among the binomial regression coefficients of the binomial relationship between the oil-gas relative permeability ratio and the gas saturation; lnc represents a constant among the binomial regression coefficients of the binomial relationship between the oil-gas relative permeability ratio and the gas saturation.

In step 104 an example method, employing a processor, establishes a gas-drive characteristic curve relationship between a produced gas-oil ratio and a cumulative oil production under a steady seepage flow of the gas-drive reservoir based on relationships between oil-gas formation flow rates and surface flow rates, the relationship between the oil-gas relative permeability ratio and the oil-gas flow rates, the binomial relationship between the oil-gas relative permeability ratio and the gas saturation, as well as the gas saturation, and determine binomial regression coefficients of the gas-drive characteristic curve relationship.

In example embodiments the method of step 104 may include:

establishing relationships between oil-gas formation flow rates and surface flow rates:

$$\begin{cases} q_g = (q_{gsc} - q_{osc}R_{si})B_g \\ q_o = q_{osc}B_o \end{cases};$$

where, $q_g$ represents a gas flow rate under a formation condition; $q_o$ represents an oil flow rate under the formation condition; $q_{gsc}$ represents a gas flow rate under a surface condition; $q_{osc}$ represents an oil flow rate under the surface condition; $B_g$ represents a gas formation volume factor; $R_{si}$ represents an initial solution gas-oil ratio; $B_o$ represents an oil formation volume factor;

establishing a gas-drive characteristic curve relationship between a produced gas-oil ratio and a cumulative oil production under a steady seepage flow of the gas-drive reservoir based on the relationships between the oil-gas formation flow rates and surface flow rates, the relationship between the oil-gas relative permeability ratio and the oil-gas flow rates, the binomial relationship between the oil-gas relative permeability ratio and the gas saturation, as well as the gas saturation:

$$\ln(GOR - R_{si}) =$$

$$\frac{aB_o^2(1-S_{wi})^2}{N^2B_{oi}^2}N_p^2 + \frac{2aNB_o(B_{oi}-B_o)(1-S_{wi})^2 + bNB_{oi}B_o(1-S_{wi})}{N^2B_{oi}^2}N_p +$$

$$\frac{aNB_o(B_{oi}-B_o)(1-S_{wi})^2 + bNB_{oi}B_o(1-S_{wi})}{N^2B_{oi}^2} + \ln\frac{\mu_o B_o c}{\mu_g B_g};$$

where, GOR represents a produced gas-oil ratio, $GOR = q_{gsc}/q_{osc}$; $q_{gsc}$ represents a gas flow rate under the surface condition; $q_{osc}$ represents an oil flow rate under the surface condition; $R_{si}$ represents an initial solution gas-oil ratio; a, b and lnc are binomial regression coefficients of the binomial relationship between the oil-gas relative permeability ratio and the gas saturation; $B_o$ represents an oil formation volume factor; $B_{oi}$ represents an initial oil formation volume factor; $S_{wi}$ represents an irreducible water saturation; N represents a geologic reserve of oil; $N_p$ represents a cumulative oil production; $\mu_o$ represents an oil viscosity under the formation condition; $\mu_g$ represents a gas viscosity under the formation condition; $B_g$ represents a gas formation volume factor;

and determining binomial regression coefficients of the gas-drive characteristic curve relationship:

$$\begin{cases} A = \dfrac{aB_o^2(1-S_{wi})^2}{N^2 B_{oi}^2} \\ B = \dfrac{2aNB_o(B_{oi}-B_o)(1-S_{wi})^2 + bNB_{oi}B_o(1-S_{wi})}{N^2 B_{oi}^2} \\ C = \dfrac{aNB_o(B_{oi}-B_o)(1-S_{wi})^2 + bNB_{oi}B_o(1-S_{wi})}{N^2 B_{oi}^2} + \ln\dfrac{\mu_o B_o c}{\mu_g B_g} \end{cases} ;$$

where, A, B and C are binomial regression coefficients of the gas-drive characteristic curve relationship; A represents a quadratic coefficient among the binomial regression coefficients of the gas-drive characteristic curve relationship; B represents a linear coefficient among the binomial regression coefficients of the gas-drive characteristic curve relationship; C represents a constant among the binomial regression coefficients of the gas-drive characteristic curve relationship.

In step 105 an example method, employing a processor, may determine a single-well dynamic reserve and recoverable reserve of the gas-drive reservoir based on the binomial regression coefficients of the gas-drive characteristic curve relationship and binomial regression coefficients of the binomial relationship between the oil-gas relative permeability ratio and the gas saturation.

In example embodiments step 105 may include:

determining a single-well dynamic reserve of the gas-drive reservoir based on the quadratic coefficient among the binomial regression coefficients of the gas-drive characteristic curve relationship and the quadratic coefficient among the binomial regression coefficients of the binomial relationship between the oil-gas relative permeability ratio and the gas saturation:

$$N_s = \sqrt{\dfrac{aB_o^2(1-S_{wi})^2}{AB_{oi}^2}} = \sqrt{\dfrac{a}{A}}\dfrac{B_o}{B_{oi}}(1-S_{wi});$$

where, $N_s$ represents the single-well dynamic reserve; a represents a quadratic coefficient among the binomial regression coefficients of the binomial relationship between the oil-gas relative permeability ratio and the gas saturation; $B_o$ represents an oil formation volume factor; $B_{oi}$ represents an initial oil formation volume factor; $S_{wi}$ represents an irreducible water saturation; A represents a quadratic coefficient among the binomial regression coefficients of the gas-drive characteristic curve relationship; and determining a recoverable reserve of the gas-drive reservoir based on the binomial regression coefficients of the gas-drive characteristic curve relationship:

$$N_{pmax} = \dfrac{-B + \sqrt{B^2 - 4A(C - \ln(GOR_{max} - R_{si}))}}{2A};$$

where, $N_{pmax}$ represents the recoverable reserve; A represents a quadratic coefficient among the binomial regression coefficients of the gas-drive characteristic curve relationship; B represents a linear coefficient among the binomial regression coefficients of the gas-drive characteristic curve relationship; C represents a constant among the binomial regression coefficients of the gas-drive characteristic curve relationship; $GOR_{max}$ represents an economic-limit produced gas-oil ratio; $R_{si}$ represents an initial solution gas-oil ratio.

By way of further illustration, assume that well P1 in a reservoir has undergone gas injection development after experiencing early depletion development. Since Well P1 does not produce water, the reservoir seepage is equivalent to the oil and gas seepage under an irreducible water saturation. Based on the principle of material balance, an oil saturation of the reservoir at any time is a ratio of a remaining oil volume in the reservoir to a tore volume of the reservoir.

$$S_o = \dfrac{(N-N_p)B_o}{NB_{oi}/(1-S_{wi})} = \dfrac{(N-N_p)B_o}{NB_{oi}}(1-S_{wi}) \qquad (1)$$

where, N represents a geologic reserve of oil, $10^4$ m$^3$; $N_p$ represents a cumulative oil production, $10^4$ m$^3$; $B_o$ represents an oil formation volume factor; $B_{oi}$ represents an initial oil formation volume factor.

A gas saturation in the process of gas injection to displace oil may be expressed as:

$$S_g = 1 - S_{wi} - S_o \qquad (2)$$

where, $S_o$ represents the oil saturation; $S_{wi}$ represents the irreducible water saturation.

Substituting Eq. (1) into Eq. (2) yields the gas saturation of the reservoir at any time:

$$S_g = 1 - S_{wi} - \dfrac{(N-N_p)B_o}{NB_{oi}}(1-S_{wi}) = \qquad (3)$$
$$\dfrac{N(B_{oi}-B_o)(1-S_{wi})}{NB_{oi}} + \dfrac{B_o(1-S_{wi})}{NB_{oi}}N_p$$

Under a steady seepage flow of the gas-drive reservoir, a relationship between an oil-gas relative permeability ratio and oil-gas flow rates is established based on Darcy's law:

$$\dfrac{q_g}{q_o} = \dfrac{\mu_o}{\mu_g} \cdot \dfrac{k_{rg}}{k_{ro}} \qquad (4)$$

where: $q_g$ represents a gas flow rate under a formation condition, m$^3$; $q_o$ represents an oil flow rate under the formation condition, m$^3$; $\mu_o$ represents an oil viscosity under the formation condition, mPa·s; $\mu_g$ represents a gas viscosity under the formation condition, mPa·s.

Relationships between oil-gas formation flow rates and surface flow rates may be established as:

$$\begin{cases} q_g = (q_{gsc} - q_{osc}R_{si})B_g \\ q_o = q_{osc}B_o \end{cases} \qquad (5)$$

where, $q_{gsc}$ represents a gas flow rate under a surface condition, m³; $q_{osc}$ represents an oil flow rate under the surface condition, m³; $B_g$ represents a gas formation volume factor; $R_{si}$ represents an initial solution gas-oil ratio, m³/m³.

According to a relationship curve between the oil-gas relative permeability ratio and the gas saturation in a semi-log plot, correlation coefficients on a binomial fitted curve are larger than those on a linear fitted curve. In example embodiments, the oil-gas relative permeability ratio and the gas saturation may be expressed by a binomial fitted relationship:

$$\ln\frac{k_{ro}}{k_{rg}} = aS_g^2 + bS_g + \ln c \tag{6}$$

where, $K_{ro}$ represents a relative permeability of oil; $K_g$ represents a relative permeability of gas; $S_g$ represents a gas saturation; a, b and lnc define a binomial regression coefficient.

Solving Eq. (6) on both sides leads to:

$$\frac{k_{ro}}{k_{rg}} = ce^{(aS_g^2 + bS_g)} \tag{7}$$

Substituting Eqs. (5) and (7) into Eq. (4) leads to:

$$\frac{(q_{gsc} - q_{osc}R_{si})B_g}{q_{osc}B_o} = \frac{\mu_o}{\mu_g}ce^{(aS_g^2 + bS_g)} \tag{8}$$

Transposing and combining like terms of Eq. (8) leads to:

$$q_{gsc} = \left(R_{si} + \frac{\mu_o B_o c e^{(aS_g^2 + bS_g)}}{\mu_g B_g}\right) q_{osc} \tag{9}$$

Transposing terms of Eq. (9) leads to:

$$GOR - R_{si} = \frac{\mu_o B_o c e^{(aS_g^2 + bS_g)}}{\mu_g B_g} \tag{10}$$

where, GOR represents a produced gas-oil ratio, GOR=$q_{gsc}$/$q_{osc}$.

Applying the logarithm of both sides of Eq. (10) leads to:

$$\ln(GOR - R_{si}) = \ln\frac{\mu_o B_o c}{\mu_g B_g} + aS_g^2 + bS_g \tag{11}$$

Substituting Eq. (3) into Eq. (11) leads to:

$$\ln(GOR - R_{si}) = \frac{aB_o^2(1 - S_{wi})^2}{N^2 B_{oi}^2}N_p^2 + \frac{2aNB_o(B_{oi} - B_o)(1 - S_{wi})^2 + bNB_{oi}B_o(1 - S_{wi})}{N^2 B_{oi}^2}N_p + \tag{12}$$

-continued
$$\frac{aNB_o(B_{oi} - B_o)(1 - S_{wi})^2 + bNB_{oi}B_o(1 - S_{wi})}{N^2 B_{oi}^2} + \ln\frac{\mu_o B_o c}{\mu_g B_g}$$

Eq. (12) denotes a new gas-drive characteristic curve relationship of the gas injection development reservoir, which is simplified by:

$$\ln(GOR - R_{si}) = AN_p^2 + BN_p + C \tag{13}$$

where:

$$\begin{cases} A = \frac{aB_o^2(1 - S_{wi})^2}{N^2 B_{oi}^2} \\ B = \frac{2aNB_o(B_{oi} - B_o)(1 - S_{wi})^2 + bNB_{oi}B_o(1 - S_{wi})}{N^2 B_{oi}^2} \\ C = \frac{aNB_o(B_{oi} - B_o)(1 - S_{wi})^2 + bNB_{oi}B_o(1 - S_{wi})}{N^2 B_{oi}^2} + \ln\frac{\mu_o B_o c}{\mu_g B_g} \end{cases} \tag{14}$$

Figure 2:
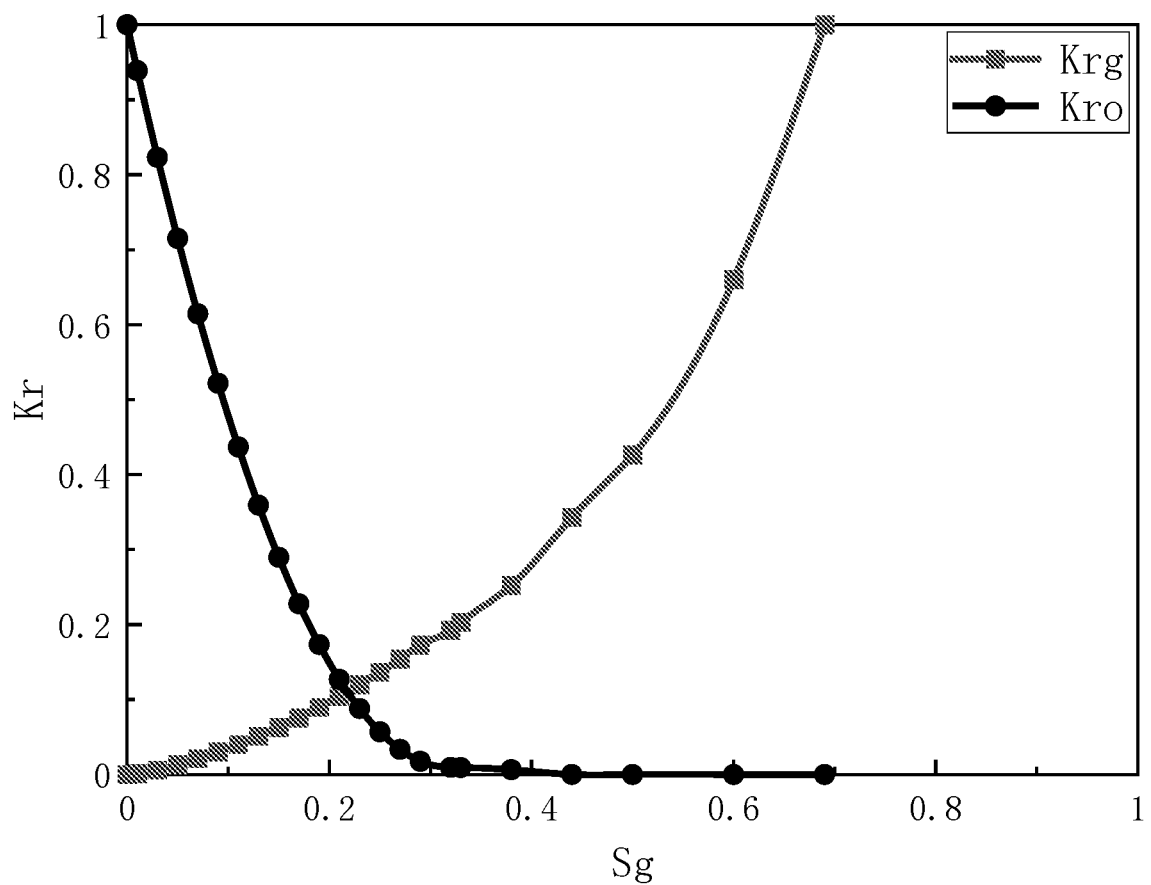
FIG. 2 shows oil-gas relative permeability curves according to an example embodiment.
Figure 3:
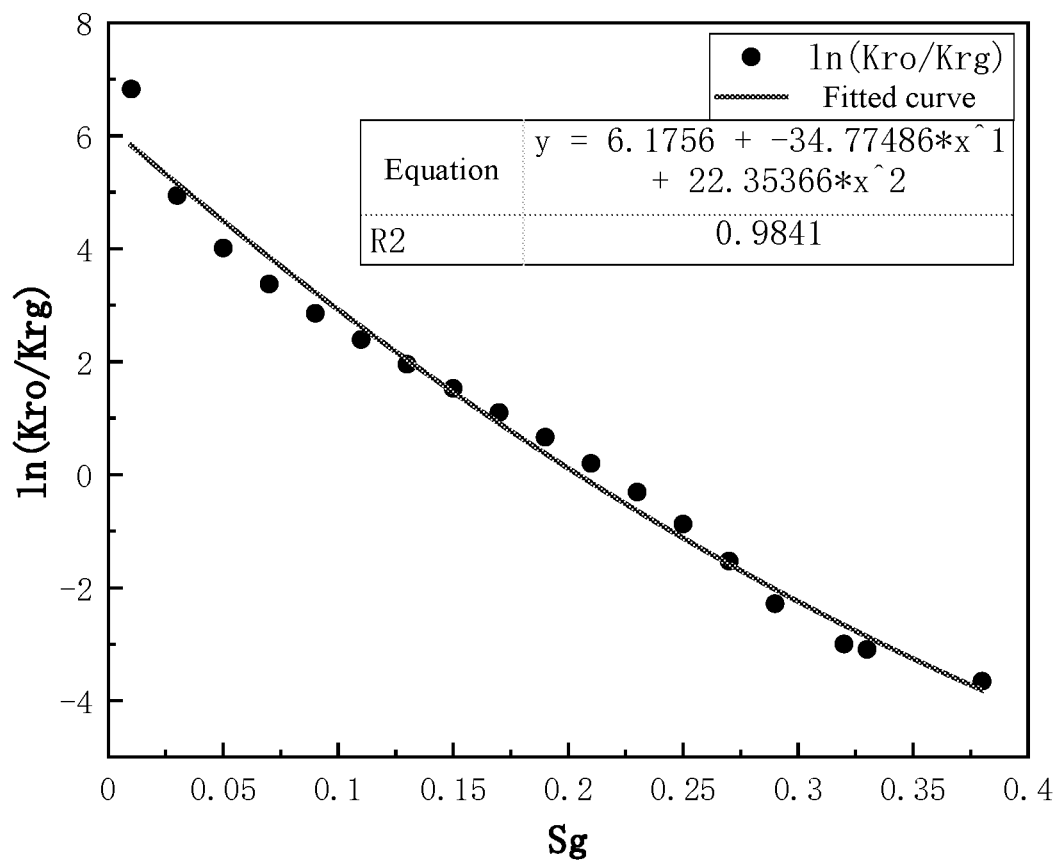
FIG. 3 shows a $\ln(K_{rg}/K_{ro})$–$S_g$ relationship curve and a binomial fitted curve according to an example.

A relationship curve of $\ln(K_{rg}/K_{ro})$–$S_g$ is drawn based on oil-gas relative permeability curves shown in FIG. 2, and as shown in FIG. 3, a binomial fitted relationship of the relationship curve is:

$$\ln\frac{k_{ro}}{k_{rg}} = 22.35366S_g^2 - 34.77486S_g + 6.1756 \tag{15}$$

where, a=22.35366, b=−34.77486 and c=480.87146.

Figure 4:
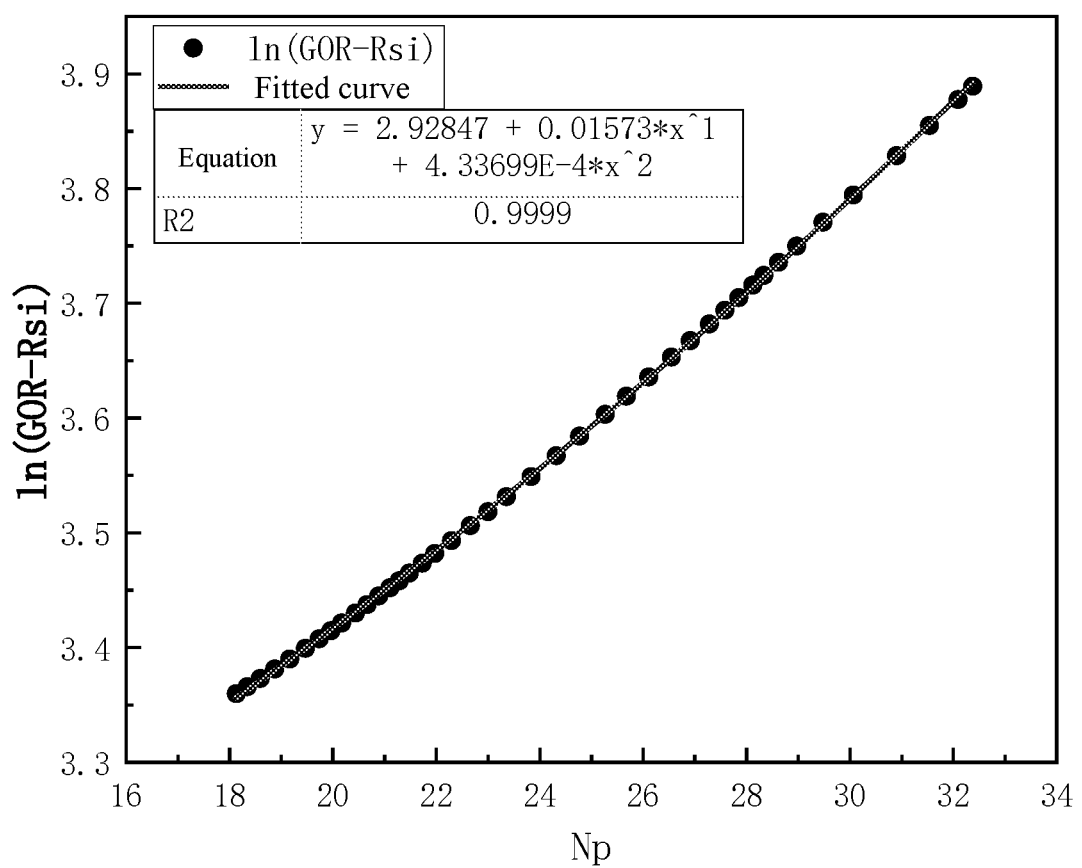
FIG. 4 shows a $\ln(GOR-R_{si})$–$N_p$ relationship curve and a binomial fitted curve according to an example embodiment.

A relationship curve between $\ln(GOR-R_{si})$–$N_p$ is drawn based on the cumulative oil production and produced gas-oil ratio of Well P1 in the reservoir. As shown in FIG. 4, the gas-drive characteristic curve relationship of the gas injection development reservoir may be expressed as:

$$\ln(GOR - R_{si}) = 4.33699 \times 10^{-5}N_p^2 + 0.01573N_p + 2.92847 \tag{16}$$

where, A=4.33699×10⁻⁴, B=0.01573 and C=2.92847.

The production performance data of Well P1 in the reservoir since the start of gas injection is shown in Table 1.

TABLE 1

Production performance data of Well P1 in the reservoir since the start of gas injection

| Date | Cumulative oil production, 10⁴ m³ | Produced gas-oil ratio, m³/m³ |
|---|---|---|
| 2017 Jan. 1 | 18.133 | 208.783 |
| 2017 Feb. 1 | 18.347 | 208.959 |
| 2017 Mar. 1 | 18.595 | 209.168 |
| 2017 Apr. 1 | 18.876 | 209.410 |
| 2017 May 1 | 19.165 | 209.667 |
| 2017 Jun. 1 | 19.469 | 209.943 |
| 2017 Jul. 1 | 19.735 | 210.192 |
| 2017 Aug. 1 | 19.960 | 210.407 |
| 2017 Sep. 1 | 20.173 | 210.614 |
| 2017 Oct. 1 | 20.438 | 210.878 |
| 2017 Nov. 1 | 20.665 | 211.109 |
| 2017 Dec. 1 | 20.889 | 211.340 |
| 2018 Jan. 1 | 21.105 | 211.568 |
| 2018 Feb. 1 | 21.286 | 211.761 |
| 2018 Mar. 1 | 21.478 | 211.970 |
| 2018 Apr. 1 | 21.730 | 212.248 |
| 2018 May 1 | 21.973 | 212.521 |
| 2018 Jun. 1 | 22.297 | 212.893 |
| 2018 Jul. 1 | 22.661 | 213.321 |
| 2018 Aug. 1 | 23.001 | 213.732 |
| 2018 Sep. 1 | 23.359 | 214.174 |

TABLE 1-continued

Production performance data of Well P1 in the reservoir since the start of gas injection

| Date | Cumulative oil production, $10^4$ m$^3$ | Produced gas-oil ratio, m$^3$/m$^3$ |
| --- | --- | --- |
| 2018 Oct. 1 | 23.833 | 214.776 |
| 2018 Nov. 1 | 24.322 | 215.417 |
| 2018 Dec. 1 | 24.774 | 216.029 |
| 2019 Jan. 1 | 25.268 | 216.715 |
| 2019 Feb. 1 | 25.677 | 217.299 |
| 2019 Mar. 1 | 26.110 | 217.934 |
| 2019 Apr. 1 | 26.549 | 218.592 |
| 2019 May 1 | 26.913 | 219.150 |
| 2019 Jun. 1 | 27.280 | 219.725 |
| 2019 Jul. 1 | 27.580 | 220.203 |
| 2019 Aug. 1 | 27.853 | 220.645 |
| 2019 Sep. 1 | 28.124 | 221.088 |
| 2019 Oct. 1 | 28.336 | 221.441 |
| 2019 Nov. 1 | 28.620 | 221.919 |
| 2019 Dec. 1 | 28.971 | 222.516 |
| 2020 Jan. 1 | 29.483 | 223.409 |
| 2020 Feb. 1 | 30.065 | 224.452 |
| 2020 Mar. 1 | 30.902 | 226.000 |
| 2020 Apr. 1 | 31.541 | 227.221 |
| 2020 May 1 | 32.093 | 228.304 |
| 2020 Jun. 1 | 32.376 | 228.869 |

According to the quadratic coefficient A among the binomial regression coefficients of the gas-drive characteristic curve and the binomial regression coefficient of $\ln(K_{rg}/K_{ro})$–$S_g$, the dynamic reserve of Well P1 in the gas injection development reservoir may be calculated as:

$$N = \sqrt{\frac{a}{A}} \frac{B_o}{B_{oi}}(1 - S_{wi}) = 159.271 \times 10^4 m^3 \quad (17)$$

When the produced gas-oil ratio of Well P1 reaches an economic-limit produced gas-oil ratio $GOR_{max}$=1000, the recoverable reserve of Well P1 is calculated according to the binomial regression coefficients A, B and C of the new gas-drive characteristic curve as:

$$N_{pmax} = \frac{-B + \sqrt{B^2 - 4A(C - \ln(GOR_{max} - R_{si}))}}{2A} = 76.978 \times 10^4 m^3 \quad (18)$$

According to the relationship between the oil-gas relative permeability ratio and the gas saturation, the material balance equation and Darcy's law, this example embodiment in accordance with principles of inventive concepts derives and establishes the gas-drive characteristic curve relationship of the gas injection development reservoir. It provides a basis for the quick calculation of the single-well dynamic reserve and recoverable reserve of the gas-drive reservoir.

This example embodiment fits the relationship curve between the oil-gas relative permeability ratio and the gas saturation at all stages in the semi-log plot based on the binomial relationship. It derives and establishes a gas-drive characteristic curve about the binomial relationship of $\ln(GOR-R_{si})$–$N_p$, and clarifies the physical meaning of the parameters in the relevant equations. Finally it calculates the single-well dynamic reserve and recoverable reserve of the gas injection development reservoir according to the binomial regression coefficients A, B and C of the gas-drive characteristic curve relationship and the binomial regression coefficient a of the oil-gas relative permeability ratio and the gas saturation in the semi-log plot. This is of great significance to the development of gas-drive reservoirs.

Figure 5:
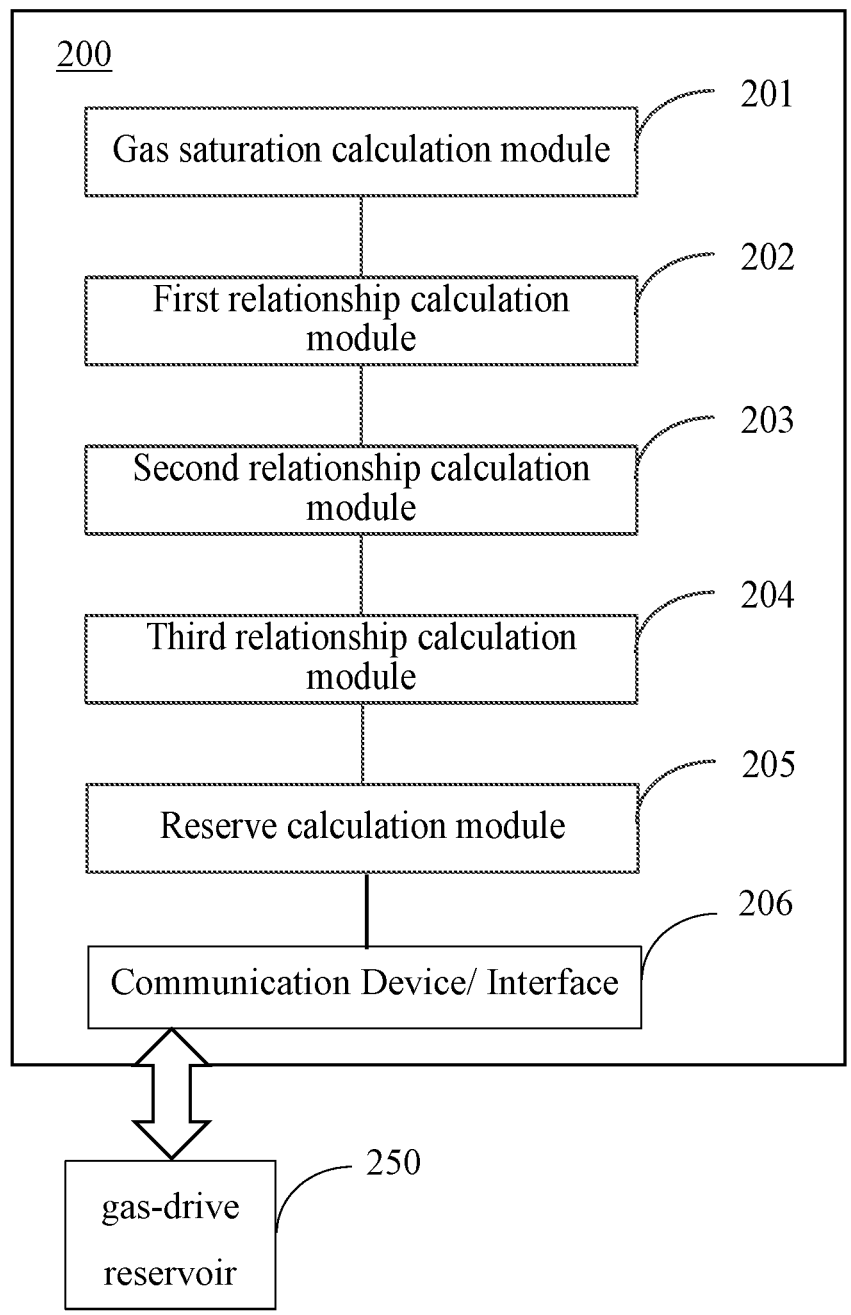
FIG. 5 is a structural diagram of a system for determining a single-well dynamic reserve and recoverable reserve of a gas-drive reservoir according to an example embodiment.

The present disclosure further provides a system for determining a single-well dynamic reserve and recoverable reserve of a gas-drive reservoir. FIG. 5 is a block diagram of an example embodiment of a system 200 for determining a single-well dynamic reserve and recoverable reserve of a gas-drive reservoir according to inventive concepts. As shown in FIG. 5, the system 200 for determining a single-well dynamic reserve and recoverable reserve of a gas-drive reservoir in this embodiment includes a gas saturation calculation module 201, a first relationship calculation module 202, a second relationship calculation module 203, a third relationship calculation module 204 and a reserve calculation module 205. Each module can include a processor configured to execute computer program instructions in a local and/or remote computer memory. The system 200 may include one or more communication devices or interfaces 206 configured to communicate with one or more sensors and/or systems that monitor and/or collect data for at least one gas-drive reservoir 250.

The gas saturation calculation module 201 may be used for calculating a gas saturation of a gas-drive reservoir based on a principle of material balance.

The first relationship calculation module 202 may be used for establishing a relationship between an oil-gas relative permeability ratio and oil-gas flow rates based on Darcy's law.

The second relationship calculation module 203 may be used for fitting a binomial relationship between the oil-gas relative permeability ratio and the gas saturation based on an oil-gas seepage law.

The third relationship calculation module 204 may be used for establishing a gas-drive characteristic curve relationship between a produced gas-oil ratio and a cumulative oil production under a steady seepage flow of the gas-drive reservoir based on relationships between oil-gas formation flow rates and surface flow rates, the relationship between the oil-gas relative permeability ratio and the oil-gas flow rates, the binomial relationship between the oil-gas relative permeability ratio and the gas saturation, as well as the gas saturation, and determining binomial regression coefficients of the gas-drive characteristic curve relationship.

The reserve calculation module 205 may be used for determining a single-well dynamic reserve and recoverable reserve of the gas-drive reservoir based on the binomial regression coefficients of the gas-drive characteristic curve relationship and binomial regression coefficients of the binomial relationship between the oil-gas relative permeability ratio and the gas saturation.

In example embodiments, the gas saturation calculation module 201 may include a processor including:

an oil saturation calculation unit, for calculating an oil saturation of the gas-drive reservoir based on a principle of material balance:

$$S_o = \frac{(N - N_p)B_o}{NB_{oi}/(1 - S_{wi})} = \frac{(N - N_p)B_o}{NB_{oi}}(1 - S_{wi});$$

where, $S_o$ represents the oil saturation; N represents a geologic reserve of oil; $N_p$ represents a cumulative oil production; $B_o$ represents an oil formation volume factor; $B_{oi}$ represents an initial oil formation volume factor; $S_{wi}$ represents an irreducible water saturation;

a gas saturation calculation unit, for calculating the gas saturation based on the oil saturation:

$$S_g = 1 - S_{wi} - S_o.$$

Each embodiment in the specification of the present disclosure is described in a progressive manner. Each embodiment focuses on the difference from other embodiments, and the same and similar parts between the embodiments may refer to each other. For the system disclosed in the embodiments, since the system corresponds to the method disclosed in the embodiments, the description is relatively simple, and reference can be made to the method description.

It can be understood by those skilled in the art that all or part of the processes for implementing the method of the above embodiments can be completed by instructing related hardware, such as a processor, through a computer program, and the program can be stored in a computer readable storage medium. The computer readable storage medium may be a magnetic disk, an optical disk, a read-only memory or a random-access memory, or other form of memory.

The above is only an example embodiments in accordance with the inventive concepts, and the protection scope of the present disclosure is not limited thereto. Any change or substitution conceivable to those skilled in the art within the technical scope disclosed by the present disclosure should be covered within the scope of the present disclosure.

Several embodiments are used for illustration of the principles and implementations of the present disclosure. The description of the embodiments is used to help illustrate the method and principles of the inventive concepts. In addition, those skilled in the art can make various modifications in terms of specific embodiments and scope of application in accordance with the teachings of the present disclosure. In conclusion, the content of this specification shall not be construed as a limitation to the present disclosure.

What is claimed is:

1. A method for determining a single-well dynamic reserve and a recoverable reserve of a gas-drive reservoir, comprising:

a processor establishing a gas saturation formula of the gas-drive reservoir based on a principle of material balance;

the processor establishing a relationship between an oil-gas relative permeability ratio and oil-gas flow rates based on Darcy's law;

the processor fitting a binomial relationship between the oil-gas relative permeability ratio and a gas saturation based on an oil-gas seepage law;

the processor establishing a gas-drive characteristic curve relationship between a produced gas-oil ratio and a cumulative oil production under a steady seepage flow of the gas-drive reservoir based on relationships between oil-gas formation flow rates and surface flow rates, the relationship between the oil-gas relative permeability ratio and the oil-gas flow rates, the binomial relationship between the oil-gas relative permeability ratio and the gas saturation, as well as the gas saturation formula;

the processor obtaining oil-gas relative permeability curves, wherein the oil-gas relative permeability curves comprise a curve of a relative permeability of oil relative to the gas saturation, and a curve of a relative permeability of gas relative to the gas saturation;

the processor calculating binomial regression coefficients of the binomial relationship between the oil-gas relative permeability ratio and the gas saturation based on the oil-gas relative permeability curves and the binomial relationship between the oil-gas relative permeability ratio and the gas saturation;

the processor obtaining actual cumulative oil production data and actual produced gas-oil ratio data of the gas-drive reservoir;

the processor calculating binomial regression coefficients of the gas-drive characteristic curve relationship based on the actual cumulative oil production data, the actual produced gas-oil ratio data and the gas-drive characteristic curve relationship;

the processor obtaining an irreducible water saturation, an economic-limit produced gas-oil ratio and an initial solution gas-oil ratio;

the processor determining the single-well dynamic reserve of the gas-drive reservoir based on the binomial regression coefficients of the binomial relationship between the oil-gas relative permeability ratio and the gas saturation, the irreducible water saturation and the binomial regression coefficients of the gas-drive characteristic curve relationship; and the processor determining the recoverable reserve of the gas-drive reservoir based on the economic-limit produced gas-oil ratio, the initial solution gas-oil ratio and the binomial regression coefficients of the gas-drive characteristic curve relationship.

2. The method according to claim 1, wherein establishing the gas saturation formula of the gas-drive reservoir based on the principle of material balance specifically comprises:

the processor establishing an oil saturation formula of the gas-drive reservoir based on the principle of material balance:

$$S_o = \frac{(N - N_p)B_o}{NB_{oi}/(1 - S_{wi})} = \frac{(N - N_p)B_o}{NB_{oi}}(1 - S_{wi});$$

wherein, $S_o$ represents an oil saturation; $N$ represents a geologic reserve of oil; $N_p$ represents the cumulative oil production; $B_o$ represents an oil formation volume factor; $B_{oi}$ represents an initial oil formation volume factor; $S_{wi}$ represents the irreducible water saturation; and the processor establishing the gas saturation formula based on the oil saturation formula: $S_g = 1 - S_{wi} - S_o$, wherein $S_g$ represents the gas saturation.

3. The method according to claim 1, wherein the relationship between the oil-gas relative permeability ratio and the oil-gas flow rates is:

$$\frac{q_g}{q_o} = \frac{\mu_o}{\mu_g} \cdot \frac{k_{rg}}{k_{ro}};$$

wherein, $q_g$ represents a gas flow rate under a formation condition; $q_o$ represents an oil flow rate under the formation condition; $\mu_o$ represents an oil viscosity under the formation condition; $\mu_g$ represents a gas viscosity under the formation condition; $k_{ro}$ represents the relative permeability of oil; $k_{rg}$ represents the relative permeability of gas.

4. The method according to claim 1, wherein the binomial relationship between the oil-gas relative permeability ratio and the gas saturation is:

$$\ln\frac{k_{ro}}{k_{rg}} = aS_g^2 + bS_g + \ln c;$$

wherein, $k_{ro}$ represents the relative permeability of oil; $k_{rg}$ represents the relative permeability of gas; $S_g$ represents the gas saturation; a represents a quadratic coefficient among the binomial regression coefficients of the binomial relationship between the oil-gas relative permeability ratio and the gas saturation; b represents a linear coefficient among the binomial regression coefficients of the binomial relationship between the oil-gas relative permeability ratio and the gas saturation;

lnc represents a constant among the binomial regression coefficients of the binomial relationship between the oil-gas relative permeability ratio and the gas saturation.

5. The method according to claim 1, wherein establishing the gas-drive characteristic curve relationship between the produced gas-oil ratio and the cumulative oil production under the steady seepage flow of the gas-drive reservoir based on the relationships between the oil-gas formation flow rates and the surface flow rates, the relationship between the oil-gas relative permeability ratio and the oil-gas flow rates, the binomial relationship between the oil-gas relative permeability ratio and the gas saturation, as well as the gas saturation formula, specifically comprises:
the processor establishing relationships between the oil-gas formation flow rates and the surface flow rates:

$$\begin{cases} q_g = (q_{gsc} - q_{osc}R_{si})B_g \\ q_o = q_{osc}B_o \end{cases};$$

wherein, $q_g$ represents a gas flow rate under a formation condition; $q_o$ represents an oil flow rate under the formation condition; $q_{gsc}$ represents a gas flow rate under a surface condition; $q_{osc}$ represents an oil flow rate under the surface condition; $B_g$ represents a gas formation volume factor; $R_{si}$ represents the initial solution gas-oil ratio; $B_o$ represents an oil formation volume factor;

the processor establishing the gas-drive characteristic curve relationship between the produced gas-oil ratio and the cumulative oil production under the steady seepage flow of the gas-drive reservoir based on the relationships between the oil-gas formation flow rates and the surface flow rates, the relationship between the oil-gas relative permeability ratio and the oil-gas flow rates, the binomial relationship between the oil-gas relative permeability ratio and the gas saturation, as well as the gas saturation formula:

$$\ln(GOR - R_{si}) =$$

$$\frac{aB_o^2(1-S_{wi})^2}{N^2B_{oi}^2}N_p^2 + \frac{2aNB_o(B_{oi}-B_o)(1-S_{wi})^2 + bNB_{oi}B_o(1-S_{wi})}{N^2B_{oi}^2}N_p +$$

$$\frac{aNB_o(B_{oi}-B_o)(1-S_{wi})^2 + bNB_{oi}B_o(1-S_{wi})}{N^2B_{oi}^2} + \ln\frac{\mu_o B_o c}{\mu_g B_g};$$

wherein, GOR represents a produced gas-oil ratio, $GOR = q_{gsc}/q_{osc}$; $q_{gsc}$ represents the gas flow rate under the surface condition; $q_{osc}$ represents the oil flow rate under the surface condition; $R_{si}$ represents the initial solution gas-oil ratio; a represents a quadratic coefficient among the binomial regression coefficients of the binomial relationship between the oil-gas relative permeability ratio and the gas saturation; b represents a linear coefficient among the binomial regression coefficients of the binomial relationship between the oil-gas relative permeability ratio and the gas saturation; lnc represents a constant among the binomial regression coefficients of the binomial relationship between the oil-gas relative permeability ratio and the gas saturation; $B_o$ represents the oil formation volume factor, $B_{oi}$ represents an initial oil formation volume factor; $S_{wi}$ represents the irreducible water saturation; N represents a geologic reserve of oil; $N_p$ represents a cumulative oil production; $\mu_o$ represents an oil viscosity under the formation condition; $\mu_g$ represents a gas viscosity under the formation condition; $B_g$ represents the gas formation volume factor; and $$\begin{cases} A = \dfrac{aB_o^2(1-S_{wi})^2}{N^2B_{oi}^2} \\ B = \dfrac{2aNB_o(B_{oi}-B_o)(1-S_{wi})^2 + bNB_{oi}B_o(1-S_{wi})}{N^2B_{oi}^2} \\ C = \dfrac{aNB_o(B_{oi}-B_o)(1-S_{wi})^2 + bNB_{oi}B_o(1-S_{wi})}{N^2B_{oi}^2} + \ln\dfrac{\mu_o B_o c}{\mu_g B_g} \end{cases};$$

wherein, A represents a quadratic coefficient among the binomial regression coefficients of the gas-drive characteristic curve relationship; B represents a linear coefficient among the binomial regression coefficients of the gas-drive characteristic curve relationship; C represents a constant among the binomial regression coefficients of the gas-drive characteristic curve relationship.

6. The method according to claim 1, wherein the single-well dynamic reserve is:

$$N_s = \sqrt{\frac{aB_o^2(1-S_{wi})^2}{AB_{oi}^2}} = \sqrt{\frac{a}{A}}\frac{B_o}{B_{oi}}(1-S_{wi});$$

wherein, $N_s$ represents the single-well dynamic reserve; a represents a quadratic coefficient among the binomial regression coefficients of the binomial relationship between the oil-gas relative permeability ratio and the gas saturation; $B_o$ represents an oil formation volume factor; $B_{oi}$ represents an initial oil formation volume factor; $S_{wi}$ represents the irreducible water saturation; A represents the quadratic coefficient among the binomial regression coefficients of the gas-drive characteristic curve relationship.

7. The method according to claim 1, wherein the recoverable reserve is:

$$N_{pmax} = \frac{-B + \sqrt{B^2 - 4A(C - \ln(GOR_{max} - R_{si}))}}{2A};$$

wherein, $N_{pmax}$ represents the recoverable reserve; A represents a quadratic coefficient among the binomial regression coefficients of the gas-drive characteristic curve relationship; B represents a linear coefficient among the binomial regression coefficients of the gas-drive characteristic curve relationship; C represents a constant among the binomial regression coefficients of the gas-drive characteristic curve relationship; $GOR_{max}$ represents the economic-limit produced gas-oil ratio; $R_{si}$ represents the initial solution gas-oil ratio.

8. A system for determining a single-well dynamic reserve and a recoverable reserve of a gas-drive reservoir, comprising:

a processor including a gas saturation calculation module, for establishing a gas saturation formula of the gas-drive reservoir based on a principle of material balance;

the processor including a first relationship calculation module, for establishing a relationship between an oil-gas relative permeability ratio and oil-gas flow rates based on Darcy's law;

the processor including a second relationship calculation module, for fitting a binomial relationship between the oil-gas relative permeability ratio and a gas saturation based on an oil-gas seepage law;

the processor including a third relationship calculation module, for establishing a gas-drive characteristic curve relationship between a produced gas-oil ratio and a cumulative oil production under a steady seepage flow of the gas-drive reservoir based on relationships between oil-gas formation flow rates and surface flow rates, the relationship between the oil-gas relative permeability ratio and the oil-gas flow rates, the binomial relationship between the oil-gas relative permeability ratio and the gas saturation, as well as the gas saturation formula;

the processor including a first obtaining module, for obtaining oil-gas relative permeability curves; wherein the oil-gas relative permeability curves comprise a curve of a relative permeability of oil relative to the gas saturation, and a curve of a relative permeability of gas relative to the gas saturation;

the processor including a first coefficient calculation module, for calculating binomial regression coefficients of the binomial relationship between the oil-gas relative permeability ratio and the gas saturation based on the oil-gas relative permeability curves and the binomial relationship between the oil-gas relative permeability ratio and the gas saturation;

the processor including a second obtaining module, for obtaining actual cumulative oil production data and actual produced gas-oil ratio data of the gas-drive reservoir;

the processor including a second coefficient calculation module, for calculating binomial regression coefficients of the gas-drive characteristic curve relationship based on the actual cumulative oil production data, the actual produced gas-oil ratio data and the gas-drive characteristic curve relationship;

the processor including a third obtaining module, for obtaining an irreducible water saturation, an economic-limit produced gas-oil ratio and an initial solution gas-oil ratio;

the processor including a single-well dynamic reserve calculation module, for determining the single-well dynamic reserve of the gas-drive reservoir based on the binomial regression coefficients of the binomial relationship between the oil-gas relative permeability ratio and the gas saturation, the irreducible water saturation and the binomial regression coefficients of the gas-drive characteristic curve relationship; and the processor including a recoverable reserve calculation module, for determining the recoverable reserve of the gas-drive reservoir based on the economic-limit produced gas-oil ratio, the initial solution gas-oil ratio and the binomial regression coefficients of the gas-drive characteristic curve relationship.

9. The system according to claim 8, wherein the gas saturation calculation module specifically comprises:

the processor including an oil saturation calculation unit, for establishing an oil saturation formula of the gas-drive reservoir based on theft principle of material balance:

$$S_o = \frac{(N-N_p)B_o}{NB_{oi}/(1-S_{wi})} = \frac{(N-N_p)B_o}{NB_{oi}}(1-S_{wi});$$

wherein, $S_o$ represents an oil saturation; N represents a geologic reserve of oil; $N_p$ represents the cumulative oil production; $B_o$ represents an oil formation volume factor; $B_{oi}$ represents an initial oil formation volume factor; $S_{wi}$ represents the irreducible water saturation; and the processor including a gas saturation calculation unit, for establishing the gas saturation formula based on the oil saturation formula: $S_g=1-S_{wi}-S_o$, wherein $S_g$ represents the gas saturation.

* * * * *